(12) United States Patent
Winburne et al.

(10) Patent No.: US 11,225,024 B2
(45) Date of Patent: Jan. 18, 2022

(54) BUILD MATERIAL RECYCLING SYSTEM OF A THREE-DIMENSIONAL (3D) PRINTER

(71) Applicant: HEWLETT-PACKARD DEVELOPMENT COMPANY, L.P., Houston, TX (US)

(72) Inventors: Robert Lawrence Winburne, Vancouver, WA (US); Randall West, Vancouver, WA (US); Nicholas Wang, Vancouver, WA (US); Luke P. Sosnowski, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 396 days.

(21) Appl. No.: 16/075,805

(22) PCT Filed: Jul. 20, 2017

(86) PCT No.: PCT/US2017/043068
§ 371 (c)(1),
(2) Date: Aug. 6, 2018

(87) PCT Pub. No.: WO2019/017953
PCT Pub. Date: Jan. 24, 2019

(65) Prior Publication Data
US 2019/0202128 A1 Jul. 4, 2019

(51) Int. Cl.
*B29C 64/357* (2017.01)
*B33Y 40/00* (2020.01)
(Continued)

(52) U.S. Cl.
CPC ............ *B29C 64/357* (2017.08); *B29C 31/02* (2013.01); *B29C 64/25* (2017.08); *B29C 64/307* (2017.08); *B33Y 40/00* (2014.12)

(58) Field of Classification Search
CPC ....... B29C 64/357; B29C 64/25; B29C 31/02; B29C 64/307; B29C 64/35; B33Y 40/00;
(Continued)

(56) References Cited

U.S. PATENT DOCUMENTS 5,940,674 A * 8/1999 Sachs ..................... B22F 3/115
419/2
7,578,958 B2 8/2009 Patel et al.
(Continued)

FOREIGN PATENT DOCUMENTS

CN 101495294 B 7/2009
CN 102164735 A 8/2011
(Continued)

OTHER PUBLICATIONS

Leslie Langnau; How Much Metal 3D Printing Powder Can You Recycle?, Jul. 27, 2016 < http://www.makepartsfast.com/how-much-metal-3d-printing-powder-can-you-recycle/ >.
(Continued)

*Primary Examiner* — Leith S Shafi
*Assistant Examiner* — Inja Song
(74) *Attorney, Agent, or Firm* — Perry + Currier Inc

(57) ABSTRACT

In some examples, a build material recycling system of a three-dimensional (3D) printer can include a build material transport system of the 3D printer, a build material recycling device of the 3D printer that includes a fluidizing membrane and is connected to the build material transport system, and a recycled build material hopper of the 3D printer connected, via the build material transport system, to the build material recycling device.

13 Claims, 3 Drawing Sheets

(51) Int. Cl.
*B29C 64/307* (2017.01)
*B29C 64/25* (2017.01)
*B29C 31/02* (2006.01)

(58) Field of Classification Search
CPC ..... B33Y 10/00; B33Y 30/00; B22F 2999/00; B22F 1/0085; B22F 1/0088; B22F 10/70
See application file for complete search history.

(56) References Cited

U.S. PATENT DOCUMENTS

| | | | |
|---|---|---|---|
| 7,828,022 | B2 | 11/2010 | Davidson et al. |
| 7,887,316 | B2 | 2/2011 | Cox |
| 8,827,681 | B2 | 9/2014 | Chen et al. |
| 9,586,365 | B2 | 3/2017 | Chen et al. |
| 2004/0084814 | A1 | 5/2004 | Boyd et al. |
| 2008/0006334 | A1* | 1/2008 | Davidson ............... B33Y 30/00 137/571 |
| 2010/0192806 | A1 | 8/2010 | Heugel et al. |
| 2015/0321253 | A1* | 11/2015 | Espinal .................. C09C 1/644 419/35 |
| 2016/0175930 | A1* | 6/2016 | She ........................ B01J 8/1836 427/455 |
| 2016/0215390 | A1* | 7/2016 | She ........................ C23C 16/01 |
| 2017/0028468 | A1 | 2/2017 | Dellea et al. |
| 2018/0281237 | A1* | 10/2018 | Frechman ................ B04C 9/00 |

FOREIGN PATENT DOCUMENTS

| | | |
|---|---|---|
| CN | 204122757 U | 1/2015 |
| CN | 105170988 A | 12/2015 |
| CN | 106003468 A | 10/2016 |
| CN | 106926454 A | 7/2017 |
| EP | 1316408 A1 | 11/2002 |
| JP | 6132962 B1 | 5/2017 |

OTHER PUBLICATIONS

Powder Recycling Station User Manual; Powder Recycling Station; Sep. 2005 http://infocenter.3dsystems.com/product-library/system/files/legacy/3DSCentral%20-%20Legacy%20Products/Accessory%20Units/1838_09563%20Powder%20Recycling%20Station_RevA.pdf.

* cited by examiner

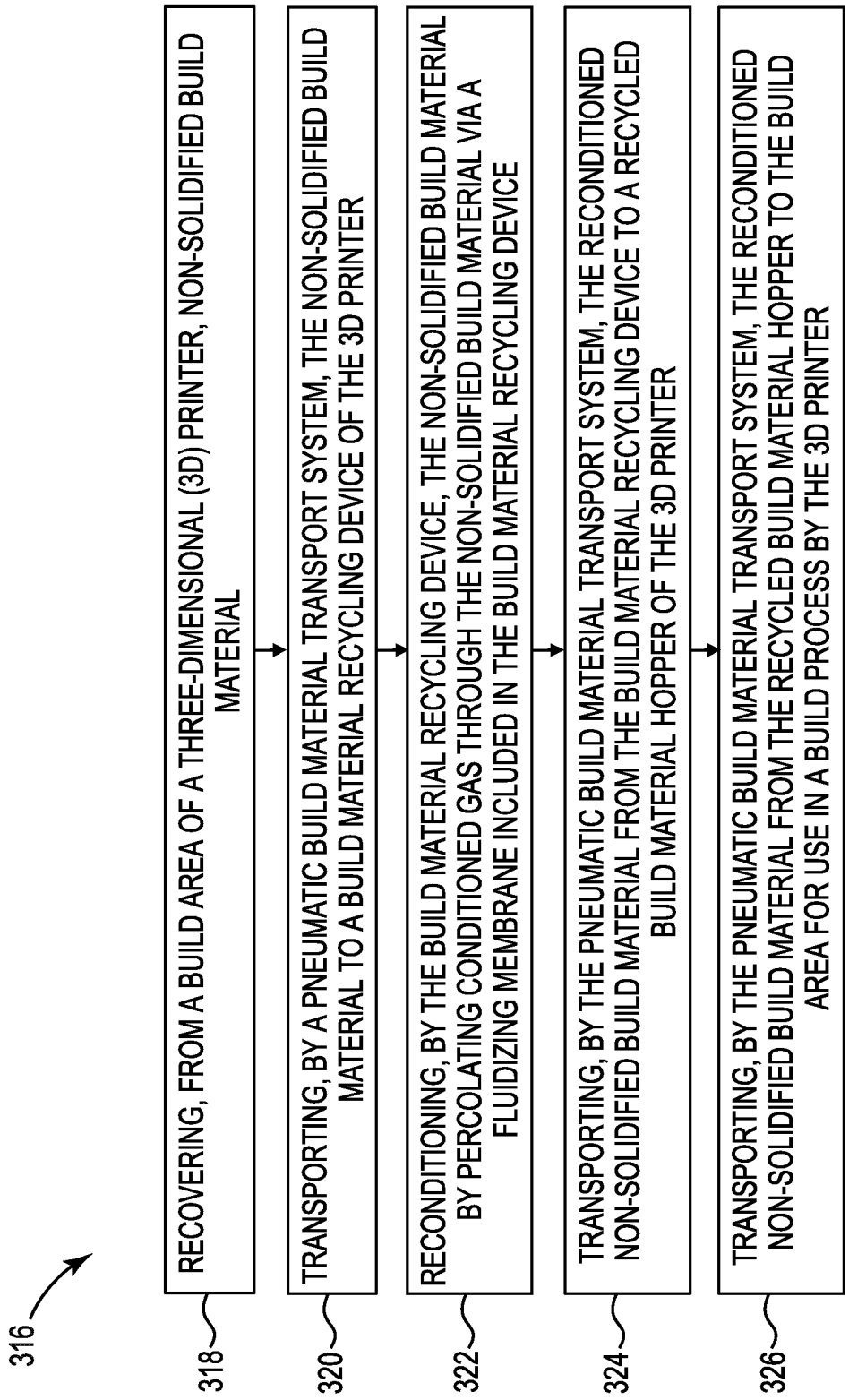

BUILD MATERIAL RECYCLING SYSTEM OF A THREE-DIMENSIONAL (3D) PRINTER

BACKGROUND

A three-dimensional (3D) printer may be used to create different 3D objects. 3D printers may utilize additive manufacturing techniques to create the 3D objects. For instance, a 3D printer may deposit material in successive layers in a build area of the 3D printer to create a 3D object. The material can be selectively fused, or otherwise solidified, to form the successive layers of the 3D object.

BRIEF DESCRIPTION OF THE DRAWINGS

FIG. 3 illustrates an example of a method to recycle build material of a 3D printer consistent with the disclosure.

DETAILED DESCRIPTION

Some 3D printers can utilize a build material to create 3D objects. The build material can have a powdered and/or granular form. The 3D printer may apply build material in successive layers in a build area to create 3D objects. The build material can be selectively fused, and a next successive layer of build material may be applied to the build area.

As used herein, the term "3D printer" can, for example, refer to a device that can create a physical 3D object during a build process of the 3D printer. In some examples, the 3D printer can create the 3D object utilizing a 3D digital model. The 3D printer can create the 3D object by, for example, depositing a build material such as powder, and a fusing agent, in a build area of the 3D printer. As used herein, the term "build area" can, for example, refer to an area of the 3D printer in which a 3D object may be created. The build material may be deposited in successive layers on a build platform located in the build area to create the 3D object. In some examples, a 3D printer can create the 3D object utilizing powder bed fusion, among other types of 3D printing. For example, a 3D printer can utilize powder bed fusion by combining a fusing agent with the build material such that the fusing agent absorbs heat from a heat source in order to melt, fuse, and solidify the build material in order to create a 3D object.

In some examples, not all of the build material supplied to the build area of the 3D printer may be utilized during a build process of a 3D object in the 3D printer. For example, incidental build material may be spilled during the build process, and/or there may be non-solidified or unfused build material left over at the end of the build process.

The incidental and/or non-solidified build material may be reused during the build process and/or in a subsequent build process. However, the incidental and/or non-solidified build material has to be recovered from the build area, and may have to be reconditioned for reuse in a build process.

A build material recycling system of a 3D printer according to the disclosure can recover incidental and/or non-solidified build material during and/or after a build process, recycle the recovered build material, and provide the recycled build material to a build area of the 3D printer for use in an ongoing or a subsequent build process. The build material recycling system can recycle and recondition the incidental and/or non-solidified build material for the use in a build process.

Figure 1:
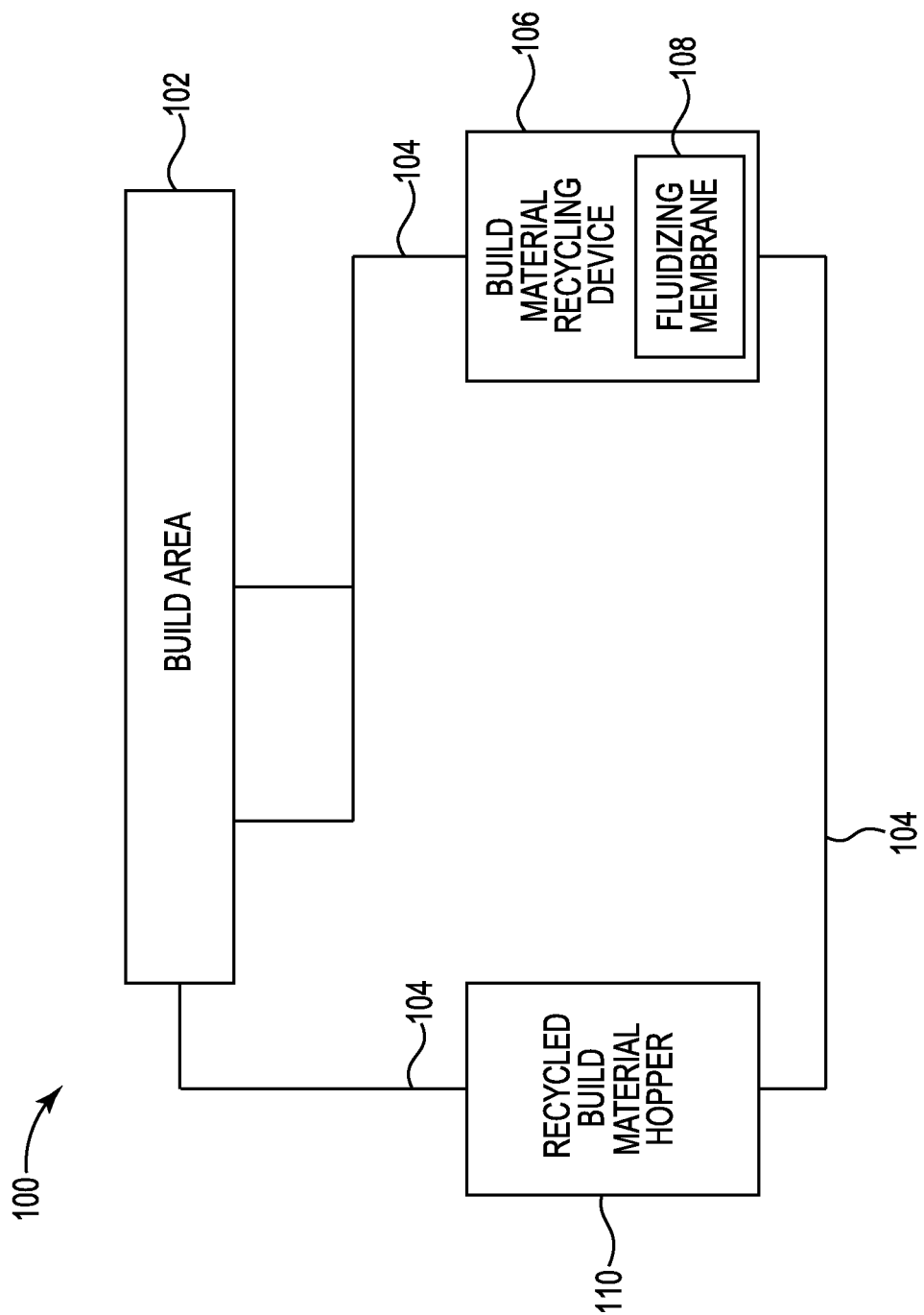
FIG. 1 illustrates an example of a build material recycling system of a 3D printer consistent with the disclosure.

FIG. 1 illustrates an example of a build material recycling system 100 of a 3D printer consistent with the disclosure. The build material recycling system 100 can include a build area 102, build material transport system 104, build material recycling device 106, and recycled build material hopper 110. Build material recycling device 106 can include a fluidizing membrane 108.

As illustrated in FIG. 1, build material transport system 104 can be connected to build area 102 of the 3D printer. As used herein, the term "build material transport system" can, for example, refer to a system of piping that can connect various components of the 3D printer such that build material can be transported to and/or from various components of the 3D printer. As used herein, the term "piping" can, for example, refer to lengths or networks of pipes. The piping of build material transport system 104 can be metal, plastic, or other materials.

For example, build material transport system 104 can transport build material to and/or from build area 102, as is further described herein. As used herein, the term "build material" can refer to a material used to create 3D objects in the 3D printer. Build material can be, for example, a powdered semi-crystalline thermoplastic material, a powdered metal material, a powdered plastic material, a powdered composite material, a powdered ceramic material, a powdered glass material, a powdered resin material, a short fiber material, and/or a powdered polymer material, among other types of powdered, powder-like, or particulate material.

Build material transport system 104 can be a pneumatic transport system. As used herein, the term "pneumatic" can, for example, refer to using gas, which may be pressurized, to exact work on a body. For example, pressurized gas may be utilized to move build material from one location to another location in the 3D printer. The pressured gas may be utilized to move the build material in piping included in the 3D printer. The piping can be part of build material transport system 104. As used herein, the term "gas" can, for example, refer to a substance which expands to fill an available space. Gas can be a gas mixture.

Although not shown in FIG. 1 for clarity and so as not to obscure examples of the disclosure, build area 102 can include a build material removal device. The build material removal device can, for example, be a vacuum to recover build material from build area 102. As used herein, the term "vacuum" can, for example, refer to a device that can cause an area of a space to be partly exhausted of gas that results in a pressure differential to cause attraction of gas and/or build material to a region of lower pressure relative to other areas of the space. The build material removal device can recover incidental build material from build area 102, allowing the recovered build material to be transported to build material recycling device 106, as is further described in connection with FIG. 2.

Although not shown in FIG. 1 for clarity and so as not to obscure examples of the disclosure, build area 102 can include a build platform. As used herein, the term "build platform" can, for example, refer to a build location of the 3D printer, such as a powder bed. For example, in a build process, the 3D printer may deposit build material in successive layers on the build platform to create a 3D object on the build platform.

In some examples, the build platform can be porous. For example, the build platform can be porous such that a low pressure relative to the build platform can cause gas and build material to pass through the porous build platform. The build platform can prevent build material from passing through the porous build platform in the absence of the low pressure. The build material transport system 104 can recover unused build material from build area 102, allowing the recovered build material to be transported to build material recycling device 106, as is further described in connection with FIG. 2.

Build material recycling system 100 can include build material recycling device 106. As used herein, the term "build material recycling device" can, for example, refer to a device that can separate build material from gas and/or other contaminants. Build material recycling device 106 can include fluidizing membrane 108. As used herein, the term "fluidizing membrane" can, for example, refer to a thin sheet of porous material such that gas can pass through fluidizing membrane 108. The porous material of the fluidizing membrane can prevent build material from passing through fluidizing membrane 108. Fluidizing membrane 108 can be a plastic, metal, and/or cloth material. For example, fluidizing membrane 108 can be a polyethylene material, cloth, plastic, metal, sintered plastic, sintered metal, and/or sintered cloth material, among other types of materials. Build material recycling device 106 can recondition the build material using fluidizing membrane 108, as is further described in connection with FIG. 2.

Build material recycling device 106 can be connected to build area 102 via build material transport system 104. For example, build material recycling device 106 can receive build material from build area 102 using a gas and build material mixture via build material transport system 104.

Build material recycling system 100 can include recycled build material hopper 110. As used herein, the term "recycled build material hopper" can, for example, refer to a chamber in which build material can be stored. Recycled build material hopper 110 can be connected to build material recycling device 106 via build material transport system 104. For example, build material that has been recycled by build material recycling device 106 can be transported, via build material transport system 104, to recycled build material hopper 110. The recycled build material can be stored in recycled build material hopper 110.

Recycled build material hopper 110 can be connected to build area 102 via build material transport system 104. For example, recycled build material stored in recycled build material hopper 110 can be transported to build area 102 to provide build material to build area 102. The recycled build material can be used in a build process, as is further described in connection with FIG. 2.

Figure 2:
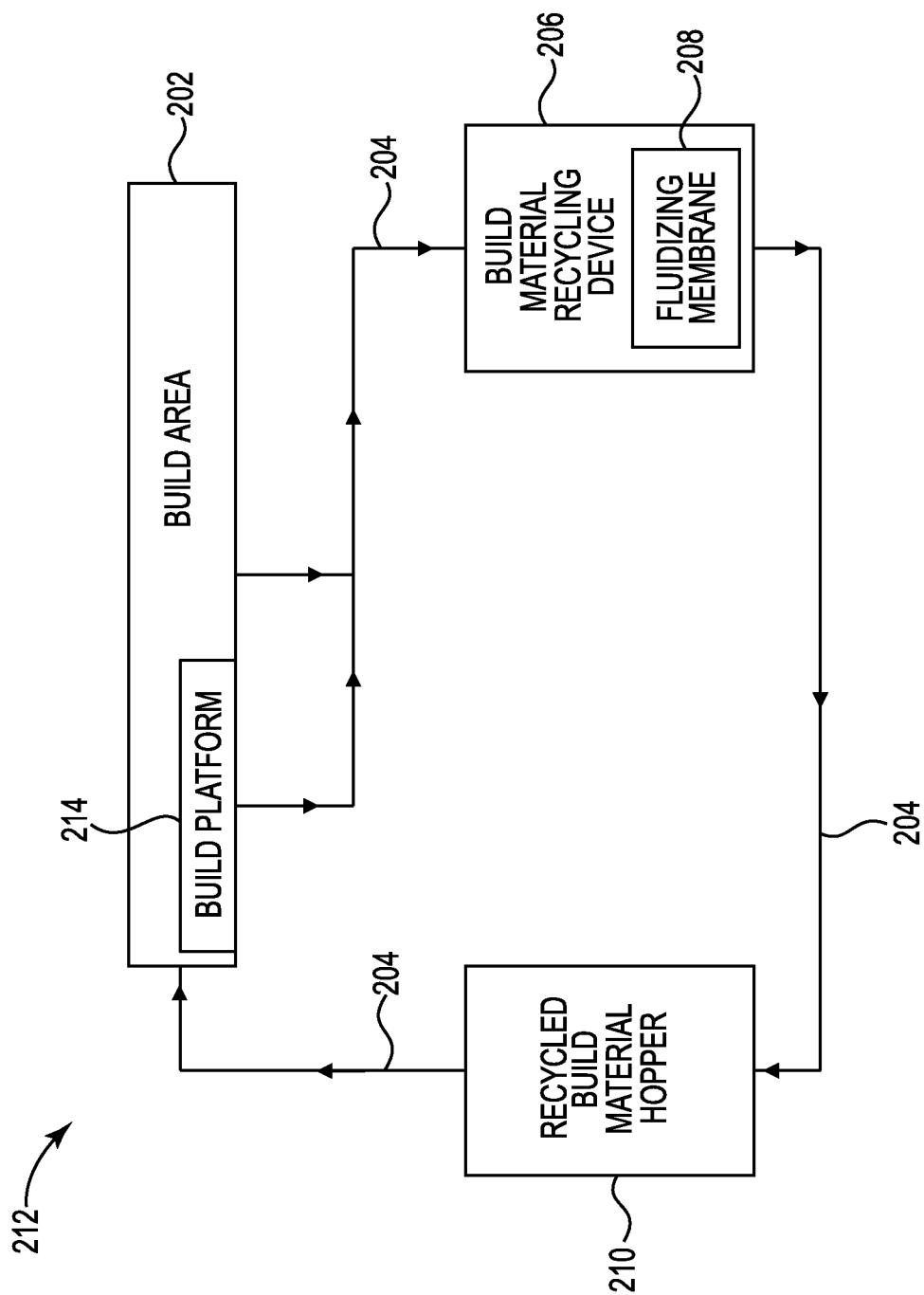
FIG. 2 illustrates an example of a build material recycling system of a 3D printer consistent with the disclosure.

FIG. 2 illustrates an example of a build material recycling system 212 of a 3D printer consistent with the disclosure. Build material recycling system 212 can include build area 202, pneumatic build material transport system 204, build material recycling device 206, and recycled build material hopper 210. Build area 202 can include build platform 214. Build material recycling device 206 can include fluidizing membrane 208.

Build material recycling system 212 can include pneumatic build material transport system 204. Pneumatic build material transport system 204 can be connected to build area 202. For example, pneumatic build material transport system 204 can transport non-solidified build material to and/or from build area 202, as is further described herein.

In some examples, not all of the build material supplied to build area 202 of the 3D printer may be utilized during a build process of a 3D object using the 3D printer. For example, incidental non-solidified build material may be spilled from build platform 214 during the build process, and/or there may be non-solidified build material left over at the end of the build process.

Build area 202 can include a build material removal device (not shown) to collect incidental non-solidified build material. For example, during a build process of a 3D object, build material may be incidentally spilled from build platform 214. The build material removal device can collect incidental non-solidified build material from build area 202. In some examples, the build material removal device can be a vacuum.

Incidental non-solidified build material can be collected by the build material removal device and transported to build material recycling device 206. For example, pneumatic build material transport system 204 can transport incidental non-solidified material from build area 202 to build material recycling device 206.

Build area 202 can include build platform 214. Build platform 214 can be porous. For example, non-solidified build material that may have been unused during a build process of a 3D object can be recovered from build area 202 via porous build platform 214. For instance, unused and non-solidified build material can be recovered by collecting the build material through porous build platform 214.

Unused and non-solidified build material can be collected through porous build platform 214 and transported to build material recycling device 206. For example, pneumatic build material transport system 204 can transport unused and non-solidified material from build platform 214 of build area 202 to build material recycling device 206.

Build material recycling device 206 can receive non-solidified build material from build area 202 via pneumatic build material transport system 204. For example, pneumatic build material transport system 204 can transport incidental non-solidified build material recovered from build area 202 via a build material removal device such as a vacuum, and unused and non-solidified build material from porous build platform 214, to build material recycling device 206.

Build material recycling device 206 can receive the non-solidified build material from build area 202 in a gas and build material mixture. Build material recycling device 206 can separate build material from the gas and build material mixture using a material separator. A material separator can include an impingement plate, a cyclone, a filter, a voluminous space, and/or a combination thereof to slow a flow rate of the gas and build material mixture to allow the build material to separate from the gas. As used herein, the term "flow rate" can, for example, refer to a volume of matter which passes per unit of time.

Build material recycling device 206 can recondition the received non-solidified build material via fluidizing membrane 208 of build material recycling device 206. Build material transported from build area 202 of the 3D printer by pneumatic build material transport system 204 may, as a result of exposure to different conditions and environments before and/or during transport, not have properties ideal for use or reuse in a build process of the 3D printer. In other words, the non-solidified build material may have to be reconditioned in order to be used in the build process of a 3D object. For example, the non-solidified build material may have to be heated, cooled, ionized, deionized, humidified, and/or de-humidified, among other examples of reconditioning techniques.

For example, the non-solidified build material may include an electric charge as a result of being transported that can cause the non-solidified build material to attract to itself, causing the non-solidified build material to be sticky. The sticky build material can create clumps and/or stick to components of the 3D printer. By humidifying the non-solidified build material, build material recycling device 206 can recondition the non-solidified build material such that the electric charge of the non-solidified build material can be removed. As a result of the removal of the electric charge, the non-solidified build material can less readily stick to itself or components of the 3D printer, allowing for easier transport and handling.

Build material recycling device 206 can include a chamber to recondition non-solidified build material when the non-solidified build material is received from build area 202 of the 3D printer and separated from the gas and build material mixture. For example, the non-solidified build material separated from the gas and build material mixture can be located in the chamber of build material recycling device 206. The chamber can include fluidizing membrane 208.

Build material recycling device 206 can recondition the received non-solidified build material by percolating conditioned gas through fluidizing membrane 208 of build material recycling device 206 and into the received non-solidified build material. As used herein, the term "conditioned gas" can, for example, refer to a gas that has been heated, cooled, ionized, de-ionized, humidified, and/or de-humidified, among other examples of conditioned gas. As used herein, the term "percolating" can, for example, refer to causing a gas to pass, filter, and/or permeate through a porous body. For example, conditioned gas can percolate through fluidizing membrane 208 into the received non-solidified build material in order to recondition the received non-solidified build material for use or reuse in a build process of the 3D printer. As described in connection with FIG. 1, fluidizing membrane 208 can be a porous material to allow conditioned gas through fluidizing membrane 208. The conditioned gas can pass through fluidizing membrane 208 and into the received non-solidified build material, but the non-solidified build material can be prevented from passing through fluidizing membrane 208.

Build material recycling system 212 can include recycled build material hopper 210. Recycled build material hopper 210 can receive the recycled and reconditioned non-solidified build material from build material recycling device 206. For example, once build material recycling device 206 has recycled non-solidified build material from build area 202, including reconditioning the non-solidified build material, the recycled non-solidified build material can be transported from build material recycling device 206 to recycled build material hopper 210. The recycled non-solidified build material can be transported to recycled build material hopper 210 via pneumatic build material transport system 204.

Recycled build material hopper 210 can store the recycled non-solidified build material until build material can be used in build area 202. For example, non-solidified build material may be used in a current or subsequent build process. The recycled non-solidified build material can be transported to build area 202 for use in the current or a subsequent build process.

The recycled non-solidified build material can be transported to build platform 214 of build area 202. For example, pneumatic build material transport system 204 can transport recycled non-solidified build material from recycled build material hopper 210 to build platform 214 of build area 202 for use in a current or subsequent 3D build process of the 3D printer.

A build material recycling system of a 3D printer according to the disclosure can allow for recovery, recycling, and reuse of non-solidified build material in a 3D printer. The recycled non-solidified build material can be reused in an ongoing build process of the 3D printer and/or used in a future build process of the 3D printer. The enclosed build material recycling system according to the disclosure can provide higher recycling efficiency relative to other build material recycling systems.

FIG. 3 illustrates an example of a method 316 to recycle build material of a 3D printer consistent with the disclosure. For example, method 316 may be performed by a build material recycling system (e.g., build material recycling system 100, 212, described in connection with FIGS. 1 and 2, respectively).

At 318, the method 316 includes recovering, from a build area of a 3D printer, non-solidified build material. For example, not all of the build material supplied to a build area of the 3D printer may be utilized during a build process of a 3D object. For instance, incidental build material may be spilled in the build area during the build process, and/or there may be non-solidified build material left over at the end of a build process. A pneumatic build material transport system can recover the non-solidified incidental and/or unused build material from the build area of the 3D printer.

In some examples, recovering non-solidified build material from the build area can include pulling non-solidified build material from a porous build platform of the build area by the pneumatic build material transport system. For example, non-solidified build material left over at the end of a build process can be pulled through the porous build platform of the build area by the pneumatic build material transport system to recover non-solidified build material from the build area.

In some examples, recovering non-solidified build material from the build area can include vacuuming incidental non-solidified build material from the build area by the pneumatic build material transport system. For example, incidental build material spilled in the build area during the build process can be vacuumed from the build area by a build material removal device, such as a vacuum. The vacuumed build material can be transported by the pneumatic build material transport system from the build area.

In some examples, the non-solidified build material, including the non-solidified unused build material left over at the end of the build process and/or the incidental build material spilled from the build platform, can be recovered after a 3D build process of the 3D printer. For example, after a 3D object has been built during a build process, non-solidified build material can be recovered from the build area of the 3D printer.

In some examples, the non-solidified build material, including the non-solidified unused and non-solidified build material left over at the end of the build process and/or the incidental non-solidified build material spilled from the build platform, can be recovered during a 3D build process of the 3D printer. For example, non-solidified build material can be recovered from the build area of the 3D printer during an ongoing build process of a 3D object.

At 320, the method 316 includes transporting, by a pneumatic build material transport system, the non-solidified build material to a build material recycling device of the 3D printer. The non-solidified build material can be transported by the pneumatic build material transport system in a gas and build material mixture.

At 322, the method 316 includes reconditioning, by the build material recycling device, the non-solidified build material by percolating conditioned gas through the non-solidified build material via a fluidizing membrane included in the build material recycling device. In some examples, the non-solidified build material may have to be reconditioned prior to reuse in the 3D printer. Reconditioning of the build material can include heating, cooling, ionizing, deionizing, humidifying, and/or de-humidifying, among other examples of reconditioning techniques.

At 324, the method 316 includes transporting, by the pneumatic build material transport system, the reconditioned non-solidified build material from the build material recycling device to a recycled build material hopper of the 3D printer. For example, once the non-solidified build material has been recycled (e.g., reconditioned), the reconditioned build material can be transported from the build material recycling device to the recycled build material hopper of the 3D printer. The reconditioned build material can be stored in the recycled build material hopper of the 3D printer until build material is to be used in the build area of the 3D printer for a build process.

At 326, the method 316 can include transporting, by the pneumatic build material transport system, the reconditioned non-solidified build material from the recycled build material hopper to the build area for use in a build process by the 3D printer. For example, reconditioned non-solidified build material can be reused in a current build process and/or used in a subsequent build process of a 3D object by the 3D printer.

As used herein, "logic" is an alternative or additional processing resource to perform a particular action and/or element described herein. Logic may include hardware. The hardware may include processing resources such as circuitry, which are distinct from machine readable instructions on a machine readable media. Further, as used herein, "a" thing may refer to one, or more than one of such things. For example, "a widget" may refer to one widget, or more than one widget.

The figures follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

The above specification, examples and data provide a description of the method and applications, and use of the system and method of the present disclosure. Since many examples may be made without departing from the spirit and scope of the system and method of the present disclosure, this specification merely sets forth some of the many possible example configurations and implementations.

What is claimed is:

1. A build material recycling system of a three-dimensional (3D) printer, comprising:
   a build material transport system of the 3D printer;
   a build material recycling device of the 3D printer connected to the build material transport system, the build material recycling device to:
      receive non-solidified build material at a fluidizing membrane of the build material recycling device;
      humidify the non-solidified build material to remove an electric charge of the non-solidified build material, percolate conditioned gas through the fluidizing membrane into the non-solidified build material to fluidize and recondition the non-solidified build material; and
   a recycled build material hopper of the 3D printer connected, via the build material transport system, to the build material recycling device.

2. The build material recycling system of claim 1, wherein the recycled build material hopper provides build material recycled by the build material recycling device for use in a build process by the 3D printer.

3. The build material recycling system of claim 1, wherein the build material transport system is connected to a build material removal device.

4. The build material recycling system of claim 1, wherein the build material transport system is connected to a porous build platform.

5. The build material recycling system of claim 1, wherein the build material recycling device includes a chamber to recondition build material when the build material is received by the build material recycling device.

6. A build material recycling system of a three-dimensional (3D) printer, comprising:
   a pneumatic build material transport system of the 3D printer connected to a build area of the 3D printer;
   a build material recycling device of the 3D printer to:
      receive non-solidified build material from the build area via the pneumatic build material transport system; and
      humidify the non-solidified build material to remove an electric charge of the non-solidified build material;
      recondition the received non-solidified build material by percolating conditioned gas through a fluidizing membrane of the build material recycling device into the humidified non-solidified build material;
   a recycled build material hopper of the 3D printer to:
      receive, via the pneumatic build material transport system, the reconditioned non-solidified build material from the build material recycling device; and
      transport, via the pneumatic build material transport system, the reconditioned non-solidified build material to a build platform in the build area.

7. The build material recycling system of claim 6, wherein:
   the build area includes a build material removal device to collect incidental non-solidified build material; and
   the incidental non-solidified build material is transported to the build material recycling device via the pneumatic build material transport system.

8. The build material recycling system of claim 6, wherein:
   the build area includes a porous build platform to collect unused and non-solidified build material; and
   the unused and non-solidified build material is transported to the build material recycling device via the pneumatic build material transport system.

9. A method, comprising:
   recovering, from a build area of a three-dimensional (3D) printer, non-solidified build material;
   transporting, by a pneumatic build material transport system, the non-solidified build material to a build material recycling device of the 3D printer;
   humidifying, by the build material recycling device, the non-solidified build material to remove an electric charge of the non-solidified build material;
   reconditioning, by the build material recycling device, the non-solidified build material by percolating conditioned gas through the non-solidified build material via a fluidizing membrane included in the build material recycling device;

transporting, by the pneumatic build material transport system, the reconditioned non-solidified build material from the build material recycling device to a recycled build material hopper of the 3D printer; and transporting, by the pneumatic build material transport system, the reconditioned non-solidified build material from the recycled build material hopper to the build area for use in a build process by the 3D printer.

10. The method of claim 9, wherein the method includes transporting the non-solidified build material in the pneumatic build material transport system as a gas and build material mixture.

11. The method of claim 9, wherein recovering the non-solidified build material from the build area includes pulling non-solidified build material from a porous build platform of the build area by the pneumatic build material transport system.

12. The method of claim 9, wherein recovering the non-solidified build material from the build area includes vacuuming incidental non-solidified build material from the build area by the pneumatic build material transport system.

13. The method of claim 9, wherein the method includes at least one of recovering the non-solidified build material:
during a 3D build process of the 3D printer; and
after a 3D build process of the 3D printer.

* * * * *